Patented Oct. 8, 1935

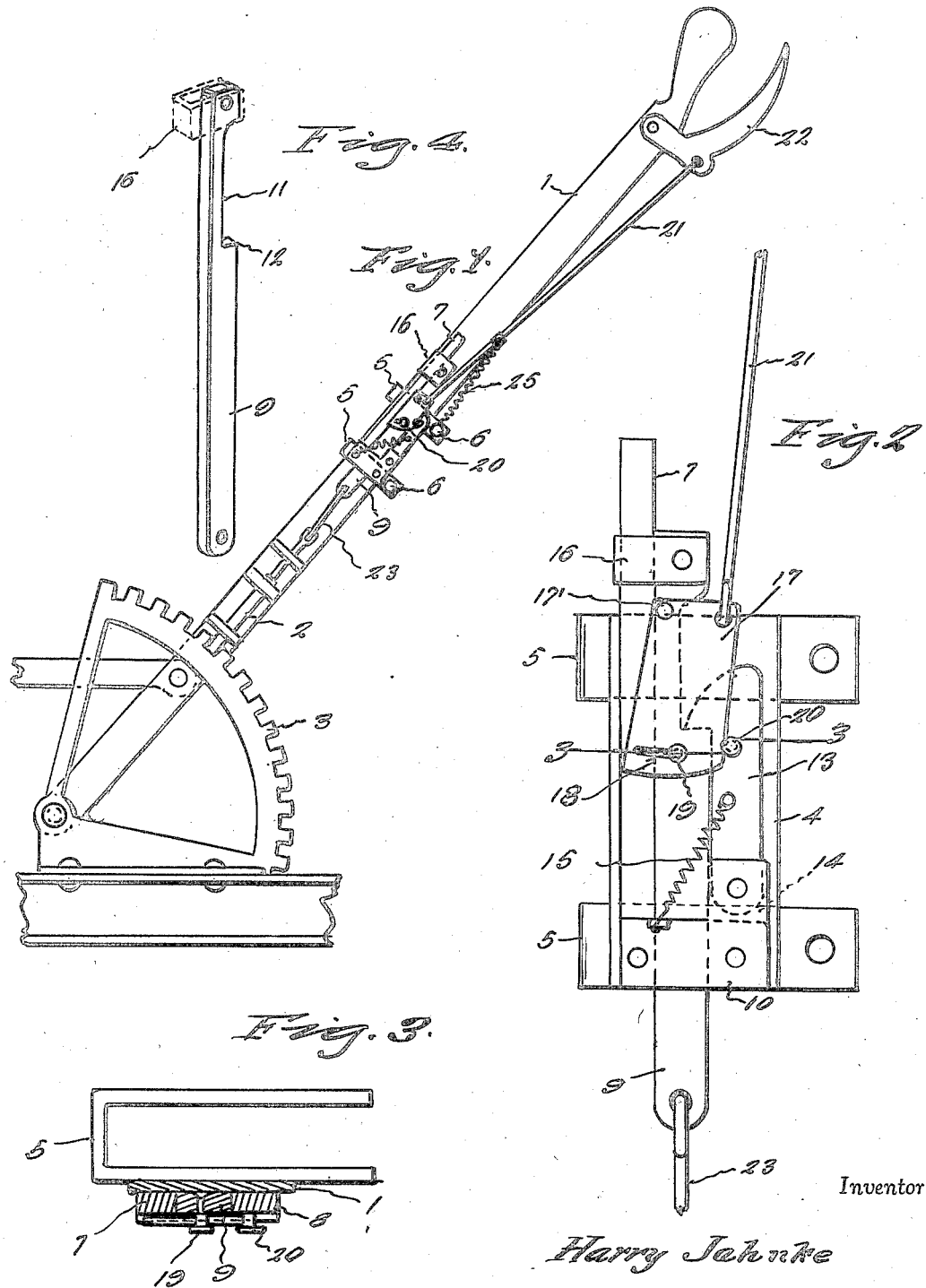

2,016,436

UNITED STATES PATENT OFFICE 2,016,436

LEVER CATCH

Harry Jahnke, Markesan, Wis.

Application January 15, 1935, Serial No. 1,941

2 Claims. (Cl. 74—535)

This invention relates to a lever catch, the general object of the invention being to provide means for firmly holding the dog of a lever in engagement with a tooth of the quadrant even though the teeth are worn.

This invention also consists in certain other features of construction and in the combination and arrangement of several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Fig. 1 is a side view of a lever of an implement showing the invention in use.

Fig. 2 is an enlarged detail view of the device.

Fig. 3 is a section on line 3—3 of Fig. 2.

Fig. 4 is a view of the slide bar.

In this drawing, the numeral 1 indicates a lever of an implement which is provided with a dog 2 for engaging the teeth of a quadrant 3 for holding the lever in adjusted position and holding a plow or the like in a certain position. As is well known, the dog frequently slips so as to permit movement of the lever and the parts to which it is attached, particularly when the teeth of the quadrant become worn. It is the object of my invention to prevent this slipping of the dog from engagement with a tooth and in carrying out my invention, I provide a supporting plate 4 provided with a pair of U-shaped brackets 5 which are adapted to be clamped to a portion of the lever bar by bolts 6 passing through holes in the ends of the limbs of the brackets, the brackets being slightly resilient to permit this clamping action. A long bar 7 and a short bar 8 are attached to the plate 4 in spaced relation to form a guideway for a slide bar 9, a lower plate 10 being connected to the lower ends of the bars 7 and 8 and bridging the guideway for holding the bar 9 in position. An elongated notch 11 is formed in one side edge of the upper portion of the slide bar 9 and forms a shoulder 12 for engagement by a latch 13 pivotally supported by the plate 4 and by a part 14 above the short bar 8, the latch being normally held in engagement with the shoulder by a spring 15. A clip 16 is fastened to the upper end of the slide bar 9 and has a sliding fit over the upper portion of the bar 7 and a plate 17 has one of its upper corners pivoted to the slide bar, the lower part of the plate having a slightly arcuate shaped slot 18 therein through which a pin 19 on the slide bar passes. A pin or projection 20 is carried by the latch and is engaged by an edge of the plate 17. A wire or rod 21 is connected to the other of the corner of the plate 17 and to the operating handle 22 of the lever and a link 23 connects the lower end of the slide bar 9 with the dog 2.

Thus it will be seen that when the handle member 22 is pressed upon, a pull is exerted upon the member 21 which rocks plate 17 on its pivot 17' and this rocking movement of the plate moves the latch 13 to released position by engagement of the pin 20 by the lower side edge and the rounded lower edge of the plate and as soon as the latch is moved to inoperative position, the slide bar with the parts attached thereto are lifted and this raising of the slide bar moves the dog 2 to the released position, so that the lever 1 can be adjusted. When the member 22 is released, the parts are moved downwardly by a spring 25 having one end attached to the upper bracket 5 and the other end to the member 21 and as soon as this slide bar has its shoulder 12 moved past the latch, the spring 15 will move the latch to holding position as shown in Fig. 2.

Thus the device will firmly hold the dog 2 in engagement with the teeth of the quadrant 3 and eliminate the danger of the lever 1 moving out of adjusted position.

It is thought from the foregoing description that the advantages and novel features of the invention will be readily apparent.

It is to be understood that changes may be made in the construction and in the combination and arrangement of the several parts, provided that such changes fall within the scope of the appended claims.

I claim:

1. A device for holding a dog of a lever in engagement with a tooth of a quadrant comprising a supporting member adapted to be attached to the lever, a slide bar carried by the supporting member, a link for connecting one end of the slide bar to the dog, a spring actuated latch member for holding the slide bar in lowered position, a cam member pivoted to the upper portion of the slide bar and engaging a part on the latch member for swinging the same to released position and a link for connecting the cam member to a pivoted handle member of the lever.

2. A device for holding a dog of a lever in engagement with a tooth of a quadrant comprising a supporting plate, brackets for connecting the plate to a part of the lever, guideway forming members carried by the plate, a slide bar slidably arranged in the guideways, means for connecting the lower end of the slide bar to the dog, said slide bar having a shoulder thereon, a spring actuated latch carried by the plate and engaging the shoulder for holding the slide bar in lowered position, a cam plate pivoted to an upper portion of the slide bar, a projection on the latch engaged by the cam plate when the same is swung outwardly for moving the latch to released position, and means for connecting the cam plate to a pivoted handle member at the upper end of the lever.

HARRY JAHNKE.